(12) United States Patent
Thyagarajan

(10) Patent No.: US 8,347,062 B2
(45) Date of Patent: *Jan. 1, 2013

(54) INTERLEAVER MEMORY ALLOCATION METHOD AND APPARATUS

(75) Inventor: Umashankar Thyagarajan, Bangalore (IN)

(73) Assignee: Lantiq Deutschland GmbH, Neubiberg (DE)

( * ) Notice: Subject to any disclaimer, the term of this patent is extended or adjusted under 35 U.S.C. 154(b) by 474 days.

This patent is subject to a terminal disclaimer.

(21) Appl. No.: 12/650,653

(22) Filed: Dec. 31, 2009

(65) Prior Publication Data

US 2010/0106922 A1    Apr. 29, 2010

Related U.S. Application Data

(63) Continuation-in-part of application No. 12/181,010, filed on Jul. 28, 2008, now Pat. No. 8,190,848.

(51) Int. Cl.
*G06F 12/00* (2006.01)
(52) U.S. Cl. ................................ 711/173; 711/E12.005
(58) Field of Classification Search .................. None
See application file for complete search history.

(56) References Cited

U.S. PATENT DOCUMENTS

| 5,809,020 | A | * | 9/1998 | Bruckert et al. | 370/335 |
| 5,812,542 | A | * | 9/1998 | Bruckert et al. | 370/335 |
| 7,340,664 | B2 | * | 3/2008 | Shen | 714/755 |
| 7,640,479 | B2 | * | 12/2009 | Shen | 714/755 |
| 2004/0117716 | A1 | * | 6/2004 | Shen | 714/776 |
| 2008/0222484 | A1 | * | 9/2008 | Shen | 714/755 |

* cited by examiner

*Primary Examiner* — Kevin Verbrugge
(74) *Attorney, Agent, or Firm* — Murphy, Bilak & Homiller, PLLC

(57) ABSTRACT

A first communication device estimates upstream channel conditions for an upstream channel and determines an upstream memory requirement for a first buffer at a second communication device and a first buffer at the first communication device based on the upstream channel conditions. A downstream memory requirement is received from the second communication device for a second buffer at the first communication device and a second buffer at the second communication device based on downstream channel conditions estimated at the second communication device for a downstream channel. The first communication device determines whether the sum of the upstream and downstream memory requirements exceeds an available amount of memory for implementing the first and second buffers at the first communication device and revises at least one of the memory requirements if the sum of the upstream and downstream memory requirements is different than the available amount of memory.

27 Claims, 7 Drawing Sheets

INTERLEAVER MEMORY ALLOCATION METHOD AND APPARATUS

PRIORITY CLAIM

This application is a continuation-in-part of U.S. patent application Ser. No. 12/181,010, filed Jul. 28, 2008, entitled "Interleaver Memory Allocation Method and Apparatus," which is incorporated by reference herein in its entirety.

BACKGROUND

Interleaving is a technique used in data communication systems for protecting codewords or other data words against burst errors that occur during data transmission. Several consecutive bits of a data stream are corrupted during transmission when a burst error occurs, e.g., due to impulse noise. Error correction schemes that expect errors to be more uniformly distributed can be overwhelmed when burst errors occur. Data is often transmitted with error control bits that enable the receiver to correct a certain number of errors that occur during transmission. However, if too many errors occur within a codeword, the codeword cannot be correctly decoded despite use of an error correction scheme. To mitigate burst errors, the codeword bits are typically interleaved before being transmitted. This way, bits from the same codeword are not transmitted in consecutive order. Instead, the codewords are broken up and the bits from different codewords are consecutively transmitted. A burst error is much less likely to corrupt a codeword because the codeword bits are more uniformly distributed during data transmission. Receivers are more capable of correctly decoding transmitted codewords when interleaving is used.

Many types of data communication systems that employ interleaving are provided a fixed amount of memory to be allocated between interleaving and de-interleaving operations. For example, DSL (digital subscriber loop) modems such as VDSL (very high speed DSL) and VDSL2 modems are typically provided a total memory size (in terms of delay octets) to be allocated between a downstream interleaver buffer and an upstream de-interleaver buffer. Codewords are interleaved in the downstream direction (i.e., from a service provider or operator to a subscriber) and de-interleaved in the upstream direction (i.e., from the subscriber to the service provider or operator). The protection capability of the interleaver depends on the size of the interleaver buffer. The amount of interleaver buffer memory (interleaver depth) is typically proportional to the data rate, maximum delay and the required minimum impulse noise protection for the downstream and upstream flows.

The fixed memory is ideally allocated so that a desired noise protection capability is achieved while maintaining optimal upstream and downstream data rates. However, the optimal upstream and downstream data rates depend on actual channel conditions and interleaver memory allocation is typically performed before channel conditions are known to the modem. For example, DSL modems typical allocate memory between interleaver and de-interleaver buffers based on data rate, maximum delay and impulse noise protection configuration parameters provided to the modem as part of the MIB (management information base). These parameters represent worse-case, best-case or expected channel conditions. Therefore, the memory may not be optimally allocated between the interleaver and de-interleaver under some conditions.

SUMMARY

According to an embodiment, a first communication device estimates upstream channel conditions for an upstream channel and determines an upstream memory requirement for a first buffer at a second communication device and a first buffer at the first communication device based on the upstream channel conditions. A downstream memory requirement is received from the second communication device for a second buffer at the first communication device and a second buffer at the second communication device based on downstream channel conditions estimated at the second communication device for a downstream channel. The first communication device determines whether the sum of the upstream and downstream memory requirements exceeds an available amount of memory for implementing the first and second buffers at the first communication device and revises at least one of the memory requirements if the sum of the upstream and downstream memory requirements is different than the available amount of memory.

According to another embodiment, a first communication device receives an upstream memory requirement from a second communication device for a first buffer at the first communication device and a first buffer at the second communication device. The upstream memory requirement is based on upstream channel conditions estimated at the second communication device for an upstream channel. The first communication device estimates downstream channel conditions for a downstream channel. The first communication device also determines a downstream memory requirement for a second buffer at the second communication device and a second buffer at the first communication device based on the downstream channel conditions and communicates the downstream memory requirement to second communication device.

Those skilled in the art will recognize additional features and advantages upon reading the following detailed description, and upon viewing the accompanying drawings.

DETAILED DESCRIPTION

Figure 1:
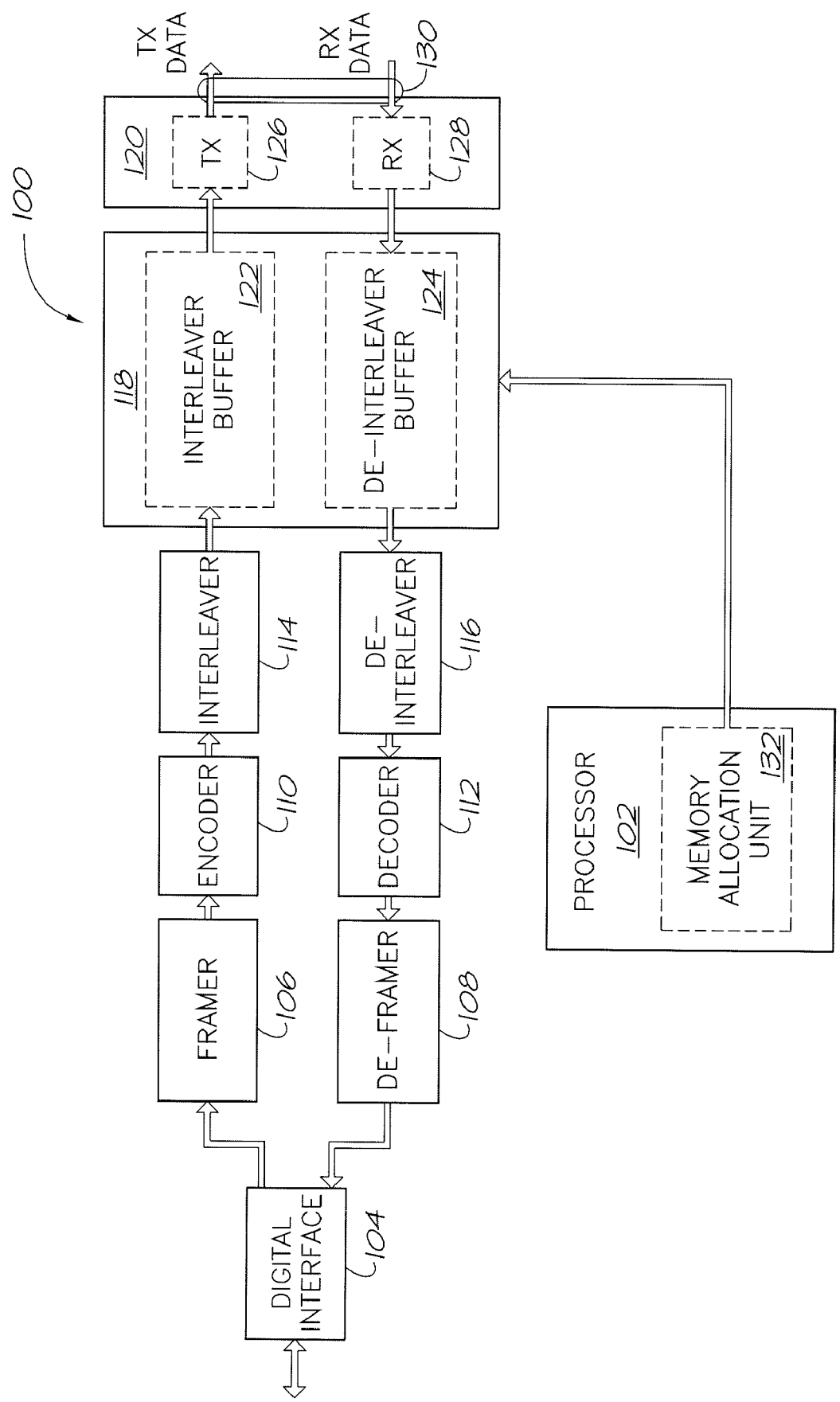
FIG. 1 is a block diagram of an embodiment of a communication device including memory allocated between interleaver and de-interleaver buffers.

FIG. 1 illustrates an embodiment of a wireless or wired communication device 100 such as a DSL or cable modem, hub or switch that transmits and receives interleaved data. The communication device 100 includes a processor 102, digital interface 104, framer/de-framer 106, 108, encoder/decoder 110, 112, interleaver/de-interleaver 114, 116, memory 118 and a front end (FE) 120. The processor 102 manages overall operation of the communication device 100. Data is transmitted from the communication device 100 to another device (not shown) via a communication channel in the downstream direction (TXDATA) and received by the communication device 100 via a different channel in the upstream direction (RXDATA). Data transmitted and received by the communication device 100 is interleaved to reduce the likelihood of data corruption caused by burst errors. Interleaving is implemented by logically segmenting the memory 118 into a downstream interleaver buffer 122 and an upstream de-interleaver buffer 124. Encoded data ready for transmission is interleaved as it is stored in the interleaver buffer 122. Received data is similarly de-interleaved as it is removed from the de-interleaver buffer 124. The memory 118 is allocated between pre-processing and post-processing buffers, e.g., between the interleaver and de-interleaver buffers 122, 124 based on one or more channel conditions as observed by the communication device 100. The one or more channel conditions can be one or more upstream channel conditions or one or more downstream channel conditions or a combination of one or more upstream and one or more downstream channel conditions. This way, the memory 118 is better allocated between upstream and downstream flows even when actual channel conditions such as impulse noise levels, user interference, cross-talk, electrical and radio interference, etc. are better or worse than expected. Moreover, the memory 118 can be allocated when a new communication channel is initialized by the communication device 100. The memory 118 can also be reallocated for a preexisting channel, e.g., when upstream and/or downstream channel conditions change or when the communication device 100 returns from a low power or sleep mode.

In more detail, the digital interface 104 provides a higher-layer network interface for the communication device 100 that is compatible with a particular data link layer protocol such as Ethernet, ATM (asynchronous transfer mode), PPP (point-to-point protocol), WiFi, WiMAX, 802.11, etc. The digital interface 104 provides data received from a network node (not shown) to the framer 106 for transmission and receives data from the de-framer 108 for higher-level processing. The framer 106 multiplexes data received from the digital interface 104 into frames. The encoder 110 performs forward error correction on the frame data, e.g., in accordance with an encoding protocol such as 8B/10B, 64B/66B, etc. The interleaver 114 then interleaves the encoded frame data so that adjacent codeword bits are not transmitted in consecutive order. The encoded frame data is stored in the interleaver buffer 122 as it is being interleaved. Transmit circuitry 126 associated with the device FE 120 transmits the interleaved data downstream over a communication link 130 such as a twisted pair cable or a wireless link. On the receive side, the FE 120 includes receive circuitry 128 for processing upstream interleaved data transmitted to the communication device 100 via an upstream channel. The FE transmit and receive circuitry 126, 128 may include analog, digital and/or mixed-signal circuitry that performs functions like signal capturing, analog domain filtering, analog-to-digital and digital-to-analog conversion, filtering, power amplification, etc. Received upstream data is stored in the de-interleaver buffer 124. The de-interleaver 116 reverses the algorithm used to perform interleaving so that the encoded frame data can be properly extracted from the de-interleaver buffer 124. The de-interleaved data is then decoded by the decoder 112 to recover the frame data. Framing information is removed by the de-framer 108 and the data of interest is sent to the digital interface 104 for further processing.

Figure 2:
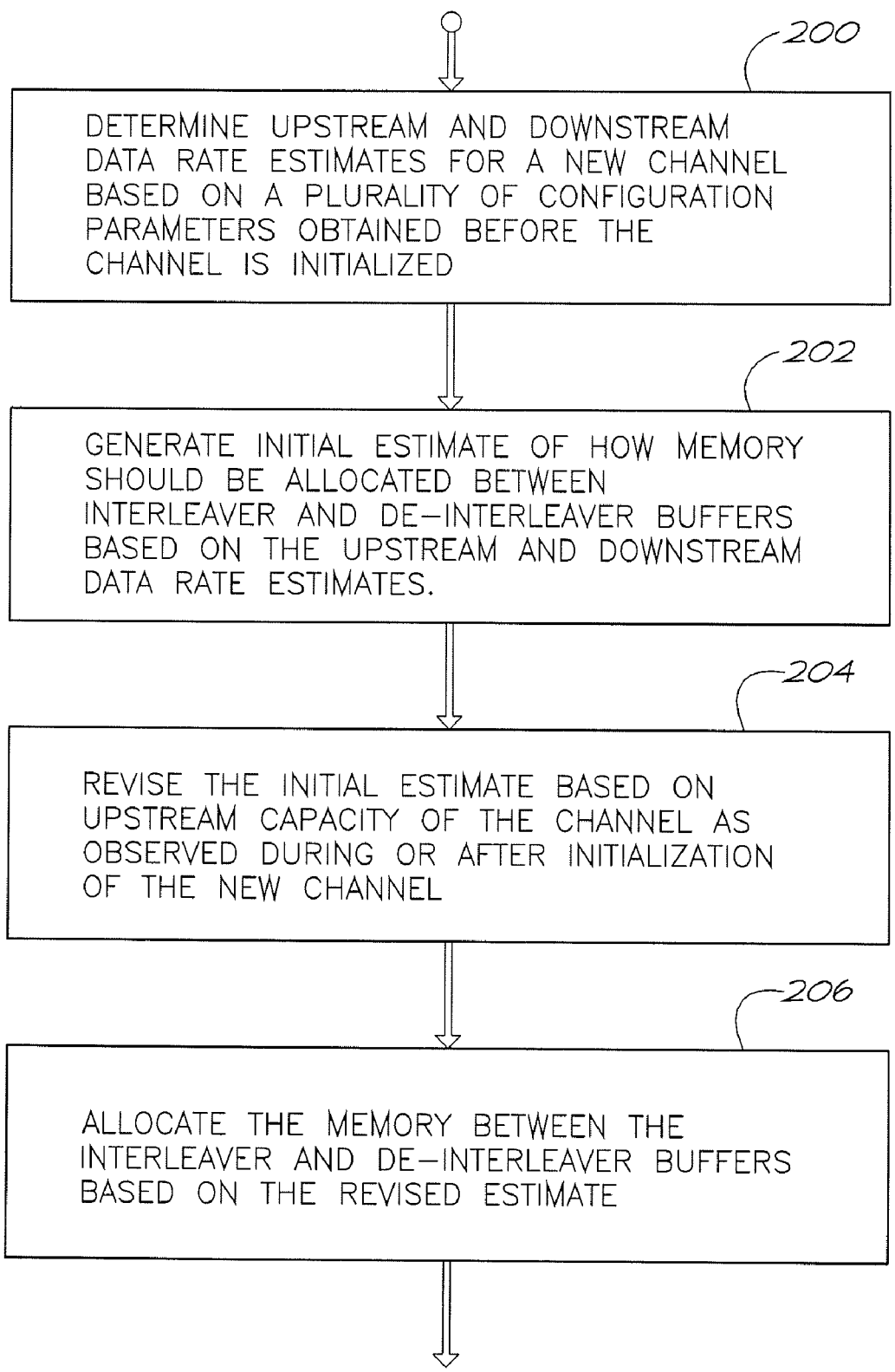
FIG. 2 is a logic flow diagram of an embodiment of processing logic for allocating memory between interleaver and de-interleaver buffers of a communication device.

The amount of memory 118 allocated between pre-processing and post-processing buffers, e.g., between the interleaver and de-interleaver buffers 122, 124 is determined by a memory allocation unit 132 included in or associated with the processor 102 or other logic (not shown) included in the communication device 100. The memory allocation unit 132 can be implemented in hardware, firmware, software or any combination thereof. FIG. 2 illustrates an embodiment of program logic executed by the memory allocation unit 132 for allocating the memory 118 between the interleaver and de-interleaver buffers 122, 124 based on upstream channel conditions. The memory allocation unit 132 determines upstream and downstream data rate estimates for a new channel based on a plurality of configuration parameters obtained before the channel is initialized by the communication device 100 (Step 200). In one embodiment, the communication device 100 is a VDSL2 modem. According to this embodiment, the upstream and downstream data rate estimates are determined based on upstream and downstream data rate, maximum delay and impulse noise protection configuration parameters provided to the device 100 as part of the MIB as is well known in the art. These parameters do not reflect actual channel conditions, but instead represent worse-case, best-case or otherwise expected conditions.

The memory allocation unit 132 initially estimates how the memory 118 should be allocated between the interleaver and de-interleaver buffers 122, 124 based on the upstream and downstream data rate estimates (Step 202). For example, if the estimated downstream rate is higher than the upstream rate, more of the memory 118 is proportionally allocated to the interleaver buffer 122 and vice-versa. If the rates are the same, the memory 118 is equally divided between both buffers 122, 124. The memory allocation unit 132 subsequently revises the initial estimate of how the memory 118 should be allocated based on the upstream capacity or downstream capacity of the channel as observed by the communication device 100 during or after initialization of the channel (Step 204). In one embodiment, the communication device 100 estimates the upstream channel based on the impulse noise levels or other channel conditions observed by the device 100 in the upstream direction. The memory 118 is then allocated between the interleaver and de-interleaver buffers 122, 124 based on the revised memory allocation estimate (Step 206). The memory allocation estimate can be recalculated if the channel conditions change or when the communication device 100 returns from a low power or sleep mode. This way, the memory 118 can be reallocated for a preexisting channel based on the recalculated estimate. This way, the memory 118 is allocated more efficiently based on actual upstream channel conditions which may substantially depart from what is expected.

Figure 3:
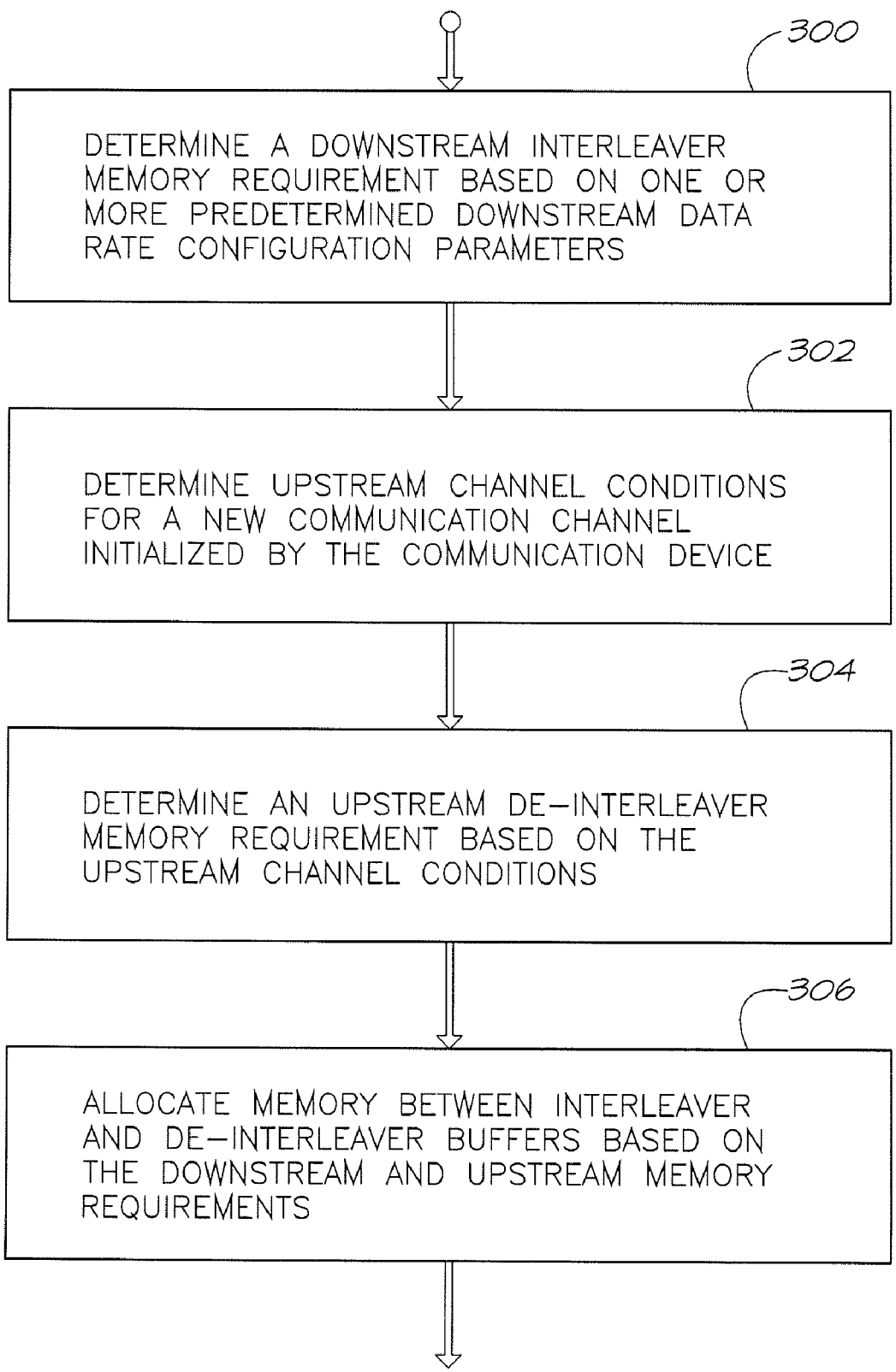
FIG. 3 is a logic flow diagram of another embodiment of processing logic for allocating memory between interleaver and de-interleaver buffers of a communication device.

FIG. 3 illustrates an embodiment of program logic executed by the memory allocation unit 132 for revising the initial estimate of how the memory 118 should be allocated based on the upstream capacity of the channel. The memory allocation unit 132 begins by determining a memory requirement for the downstream interleaver buffer 122 (Step 300). In one embodiment, the communication device 100 is a VDSL2 modem and the downstream interleaver memory requirement is computed based on downstream data rate, maximum delay and impulse noise protection configuration parameters as is well known in the art. The memory allocation unit 132 then determines the upstream channel conditions for a new communication channel initialized by the communication device 100 (Step 302). In one embodiment, the upstream channel conditions are estimated based on impulse noise levels observed by the communication device 100. A memory requirement for the upstream de-interleaver buffer 124 is determined based on the upstream channel conditions (Step 304) and the memory 118 is allocated between the interleaver and de-interleaver buffers 122, 124 based on the downstream and upstream memory requirements (Step 306). The downstream and upstream memory requirements can be revised if the channel conditions change or when the communication device 100 returns from a low power or sleep mode. This way, the memory 118 can be reallocated for a preexisting channel based on the revised requirements. Thus, the downstream memory requirement is determined using only configuration parameters while the upstream memory requirement is computed based on the actual upstream channel conditions as observed by the communication device 100.

Figure 4:
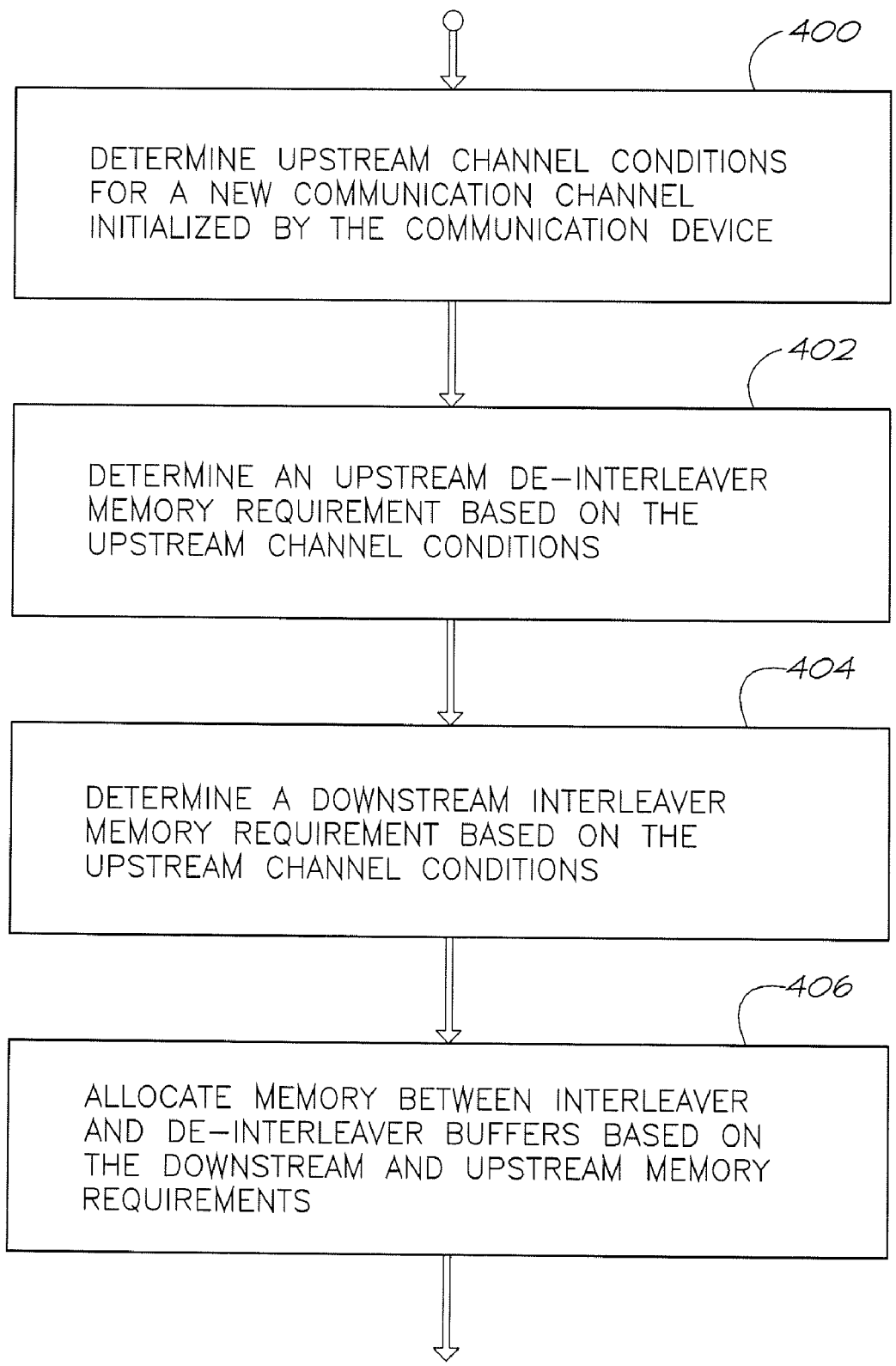
FIG. 4 is a logic flow diagram of yet another embodiment of processing logic for allocating memory between interleaver and de-interleaver buffers of a communication device.

FIG. 4 illustrates another embodiment of program logic executed by the memory allocation unit 132 for revising the initial estimate of how the memory 118 should be allocated based on the upstream capacity of the channel. According to this embodiment, both the downstream and upstream memory requirements are computed based on the upstream channel conditions. The memory allocation unit 132 begins by determining the upstream channel conditions for the communication channel initialized by the device 100 (Step 400). The memory allocation unit 132 then determines the memory requirement for the upstream de-interleaver buffer 124 based on the upstream channel conditions (Step 402). In one embodiment, the upstream de-interleaver memory requirement is determined in accordance with FIG. 3 as described above. The memory allocation unit 132 also determines the memory requirement for the downstream interleaver buffer 122 based on the upstream channel conditions (Step 404) and the memory 118 is allocated between the interleaver and de-interleaver buffers 122, 124 based on the downstream and upstream memory requirements (Step 406). The downstream and upstream memory requirements can be revised if the channel conditions change or when the communication device 100 returns from a low power or sleep mode. This way, the memory 118 can be reallocated for a preexisting channel based on the revised requirements.

In one embodiment, the memory allocation unit 132 estimates the downstream capacity of the channel based on the upstream channel conditions and determines an interleaver buffer size that satisfies the downstream capacity estimate and one or more predetermined downstream configuration parameters such as maximum expected data rate and minimum delay. Each parameter has certain criteria, e.g., a minimum and/or maximum value. In one embodiment, the buffer size is selected so that the configuration parameter criteria are satisfied. The downstream capacity of the channel can be estimated based on the upstream channel conditions by determining the ratio of a predetermined upstream data rate configuration parameter to the upstream capacity estimate and using this ratio to scale a predetermined downstream data rate configuration parameter. In one embodiment, a maximum upstream data rate configuration parameter is divided by the upstream capacity estimate. A maximum downstream data rate configuration parameter is then multiplied by the resulting quotient to compute the downstream capacity estimate.

The downstream capacity estimate can also be scaled to account for an expected difference in upstream and downstream channel conditions. That is, more or less degradation may be expected in the downstream direction than in the upstream direction. The memory allocation unit 132 can scale the downstream capacity estimate to account for this difference in expectations. Either way, the memory allocation unit 132 allocates the memory 118 between the interleaver and de-interleaver buffers 122, 124 based on the downstream and upstream memory requirements which are both computed based on the actual upstream channel conditions as observed by the communication device 100.

Figure 5:
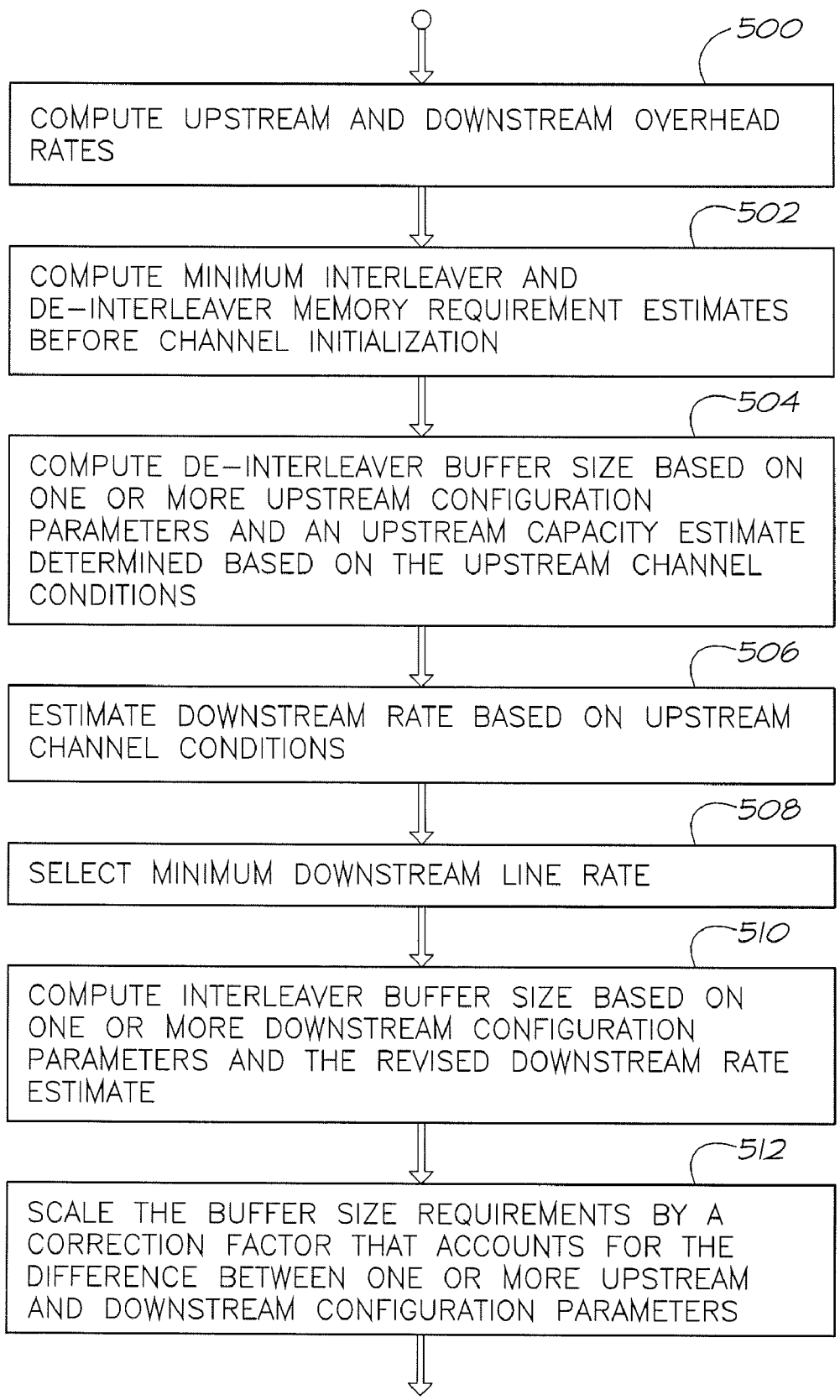
FIG. 5 is a logic flow diagram of still another embodiment of processing logic for allocating memory between interleaver and de-interleaver buffers of a communication device.

FIG. 5 illustrates yet another embodiment of program logic executed by the memory allocation unit 132 for determining the downstream and upstream memory requirements and allocating the memory 118 between the interleaver and de-interleaver buffers 122, 124 according to the requirements. The communication device 100 receives configuration parameters and stores them in the memory 118 or elsewhere. In one embodiment, the communication device 100 is a VDSL2 modem and the configuration parameters are obtained from the MIB received by the device 100. The configuration parameters include parameters for the upstream and downstream directions such as symbol rate (SYMBOL_RATE), total available memory (TOT_INT_MEM) in bytes, minimum upstream impulse noise protection (MIN_INP_US) in symbols, minimum downstream impulse noise protection (MIN_INP_DS) in symbols, maximum de-interleaving delay (MAX_DELAY_US) in ms, maximum interleaving delay (MAX_DELAY_DS) in ms, minimum upstream data rate (MIN_RATE_US) in Kbps, minimum downstream data rate (MIN_RATE_DS) in Kbps, minimum upstream overhead rate (MIN_MSG_US), minimum downstream overhead rate (MIN_MSG_DS) and the maximum interleaving depth for a given profile (DMAX_PROFILE). Several of the configuration parameters depend on the VDSL profile selected. For example, DMAX_PROFILE is derived as follows: DMAX_PROFILE=2048 octets for the 8 and 12 VDSL profiles; DMAX_PROFILE=3072 octets for the 17 VDSL profiles; and DMAX_PROFILE=4096 octets for the 30 VDSL profiles. The SYMBOL_RATE and TOT_INT_MEM configuration parameters also depend on the selected profile.

The memory allocation unit 132 retrieves various ones of the configuration parameters for use in computing the downstream and upstream memory requirements. Before a new communication channel is initialized and trained, the memory allocation unit 132 computes upstream and downstream overhead rates OH_US and OH_DS (Step 500) as given by:

$$OH\_US=[1+(2\times MIN\_INP\_US)/(MAX\_DELAY\_US\times SYMBOL\_RATE)]$$

$$OH\_DS=[1+(2\times MIN\_INP\_DS)/(MAX\_DELAY\_DS\times SYMBOL\_RATE)] \quad (1)$$

The upstream and downstream overheard rates account for the estimated coding needed in the upstream and downstream directions, respectively, to satisfy the minimum upstream and downstream INP requirements. The memory allocation unit 132 also computes minimum interleaver and de-interleaver memory requirement estimates based on the MIN_RATE_US and MIN_RATE_DS configuration parameters before channel initialization and training as is well known in the art (Step 502).

A communication channel is then initialized and trained by the communication device 100. During the channel initialization and training process, the memory allocation unit 132 determines the upstream channel conditions, e.g., based on impulse noise levels observed by the device 100. The upstream capacity of the channel can be estimated based on the upstream channel conditions. In one embodiment, the upstream channel capacity is estimated by computing the upstream line rate (US_LINE_RATE_CALC). The upstream line rate is the payload or symbol rate in the upstream direction plus the overhead rate needed to account for the observed channel noise. Additional channel capacity is needed for coding overhead when the upstream channel is relatively noisy, leaving less channel capacity for actual payload. The reverse holds true when upstream channel conditions are less noisy. The memory allocation unit 132 computes the size of the upstream de-interleaver buffer 124 that satisfies one or more predetermined upstream data rate configuration parameters and the upstream capacity estimate (Step 504).

In one embodiment, the memory allocation unit 132 computes the upstream de-interleaver buffer size by selecting the minimum upstream line rate (MIN_US_LINE_RATE) from a group including the computed upstream capacity estimate (US_LINE_RATE_CALC) as given by:

$$\text{MIN\_US\_LINE\_RATE} = \min\begin{pmatrix} \text{MAX\_CONFIG\_LINE\_RATE\_US,} \\ \text{PROVISIONED\_RATE\_US,} \\ \text{US\_LINE\_RATE\_CALC} \end{pmatrix} \quad (2)$$

MAX_CONFIG_LINE_RATE_US is a configuration parameter representing the maximum theoretical upstream line rate and PROVISIONED_RATE_US is a configuration parameter representing the maximum data capacity allocated to a user based on the upstream bandwidth being provided. The memory allocation unit 132 uses the selected minimum line rate to determine a size of the upstream de-interleaver buffer 124 that satisfies the MIN_INP_US and DMAX_PROFILE configuration parameters.

The memory allocation unit 132 also determines the downstream interleaver memory requirement by estimating a downstream capacity of the channel based on the upstream channel conditions and determining a size of the downstream interleaver buffer 122 that satisfies one or more predetermined downstream configuration parameters and the downstream capacity estimate. To this end, the memory allocation unit 132 estimates the downstream capacity of the channel by computing an estimate of the downstream line rate (Step 506) as given by:

$$\text{DS\_LINE\_RATE\_EST} = \quad (3)$$
$$\text{PROVISIONED\_RATE\_DS} \times \left(\frac{\text{US\_LINE\_RATE\_CALC}}{\text{PROVISIONED\_RATE\_US}}\right)$$

PROVISIONED_RATE_DS is a configuration parameter representing the maximum data capacity allocated to a user based on the downstream bandwidth being provided and US_LINE_RATE_CALC is the upstream channel capacity as described above. Thus, the downstream line rate estimate is scaled upward when the channel capacity is greater than the provisioned upstream line rate. To the contrary, the downstream line rate estimate is scaled downward when the channel capacity is lower than the provisioned upstream line rate (i.e., the upstream channel is relatively noisy). The memory allocation unit 132 then selects the minimum downstream line rate (Step 508) from a group of data rates including the initial downstream data rate estimate (DS_LINE_RATE_EST) as given by:

$$\text{MIN\_DS\_LINE\_RATE} = \min\begin{pmatrix} \text{MAX\_CONFIG\_LINE\_RATE\_DS,} \\ \text{PROVISIONED\_RATE\_DS,} \\ \text{DS\_LINE\_RATE\_EST} \end{pmatrix} \quad (4)$$

where MAX_CONFIG_LINE_RATE_DS is a configuration parameter representing the maximum theoretical downstream line rate. The memory allocation unit 132 uses the selected minimum downstream line rate to determine the size of the downstream de-interleaver buffer 122 which satisfies the MIN_INP_DS and DMAX_PROFILE configuration parameters (Step 510).

At this point, the size of the interleaver and de-interleaver memory buffers 122, 124 has been determined based on the actual upstream channel conditions as observed by the communication device 100. In one embodiment, the memory allocation unit 132 then scales the upstream and downstream buffer requirements as given by equations 2 and 4 using a correction factor and allocates the memory 118 based on the scaled buffer requirements (Step 512). The correction factor corresponds to the difference between one or more predetermined upstream and downstream configuration parameters. According to one embodiment, the correction factor is given by:

$$CF = \frac{(\text{MIN\_INP\_DS} \times \text{MIN\_DS\_LINE\_RATE})}{(\text{MIN\_INP\_US} \times \text{MIN\_US\_LINE\_RATE} \times \text{MAX\_DELAY\_US})} \quad (5)$$

The memory allocation unit 132 then determines whether memory allocation is to be performed in a fixed or adaptive mode. The unit 132 allocates the memory 118 between the interleaver and de-interleaver buffers 122, 124 based on the initial memory allocation estimates derived before channel initialization and training (Step 502) when operating in the fixed mode. The memory 118 is allocated in the fixed mode by determining whether the initial upstream de-interleaver memory estimate is less than the total memory allocated to the device (TOT_INT_MEM) as scaled by the correction factor (CF). If so, the size of the de-interleaver buffer 124 is set to the initial upstream de-interleaver memory estimate. Otherwise, the de-interleaver buffer size is set to TOT_INT_MEM×CF. The memory allocation unit 132 assigns the remainder of the memory 118 to the downstream interleaver buffer 122.

On the other hand, the memory allocation unit 132 uses the upstream and downstream buffer requirements calculated based on the upstream channel conditions (Steps 504 and 510) when configured in adaptive memory allocation mode. The unit 132 begins by determining whether there is enough total memory 118 to satisfy both the upstream and downstream buffer requirements. In one embodiment, the memory allocation unit 132 subtracts the downstream buffer requirement calculated in Step 510 from the total memory allocated to the device 100 (TOT_INT_MEM). If the upstream buffer requirement calculated in Step 504 is greater than the difference, enough memory is available for both buffers 122, 124 and the memory 118 can be allocated without conflict.

However, when there is not enough memory available to satisfy both buffer requirements, the memory allocation unit 132 can choose from two embodiments for allocating the memory 118. In the first embodiment, the memory allocation unit 132 determines which one of the buffers 122, 124 has a higher priority. In one embodiment, buffer priority is determined by evaluating a priority bit extracted from a configuration message received at an input of the communication device 100. If the priority bit indicates the upstream direction has priority, the memory allocation unit 132 allocates enough of the memory 118 to the upstream de-interleaver buffer 124 to satisfy the upstream buffer requirement calculated in Step 504 and the remainder of the memory 118 is allocated to the downstream interleaver buffer 122. The opposite memory allocation is performed when the priority bit indicates the downstream direction has priority. However, the buffer 122, 124 having the lower priority may not be allocated any of the memory 118 if the other buffer requires all of the memory 118.

The second embodiment for allocating the memory 118 when a conflict occurs also involves determining which one of the buffers 122, 124 has a higher priority, e.g., using the priority bit. According to the second embodiment, the memory 118 can be allocated three different ways depending on the priority and magnitude of the correction factor (CF) calculated in Step 512. When the downstream direction has priority and the CF>1, the amount of memory 118 allocated to the upstream de-interleaver buffer 124 is given by:

$$US\_INT\_MEM = \max\left(TOT\_INT\_MEM \times \left(\frac{1}{1+CF}\right), MIN\_US\_INT\_MEM\right) \quad (6)$$

where MIN_US_INT_MEM is the upstream buffer requirement calculated in Step 504. The downstream interleaver buffer 122 is then allocated the remainder of the memory 118. When the upstream direction has priority and the CF<1, the amount of memory 118 allocated to the downstream interleaver buffer 122 is given by:

$$DS\_INT\_MEM = \max(TOT\_INT\_MEM \times CF, MIN\_DS\_INT\_MEM) \quad (7)$$

where MIN_DS_INT_MEM is the downstream buffer requirement calculated in Step 510. The upstream interleaver buffer 124 is allocated the remainder of the memory 118. The third memory allocation option arises when neither of the first two conditions identified above are satisfied. Here, the total available memory 118 is split equally between the interleaver and de-interleaver buffers 122, 124.

Figure 6:
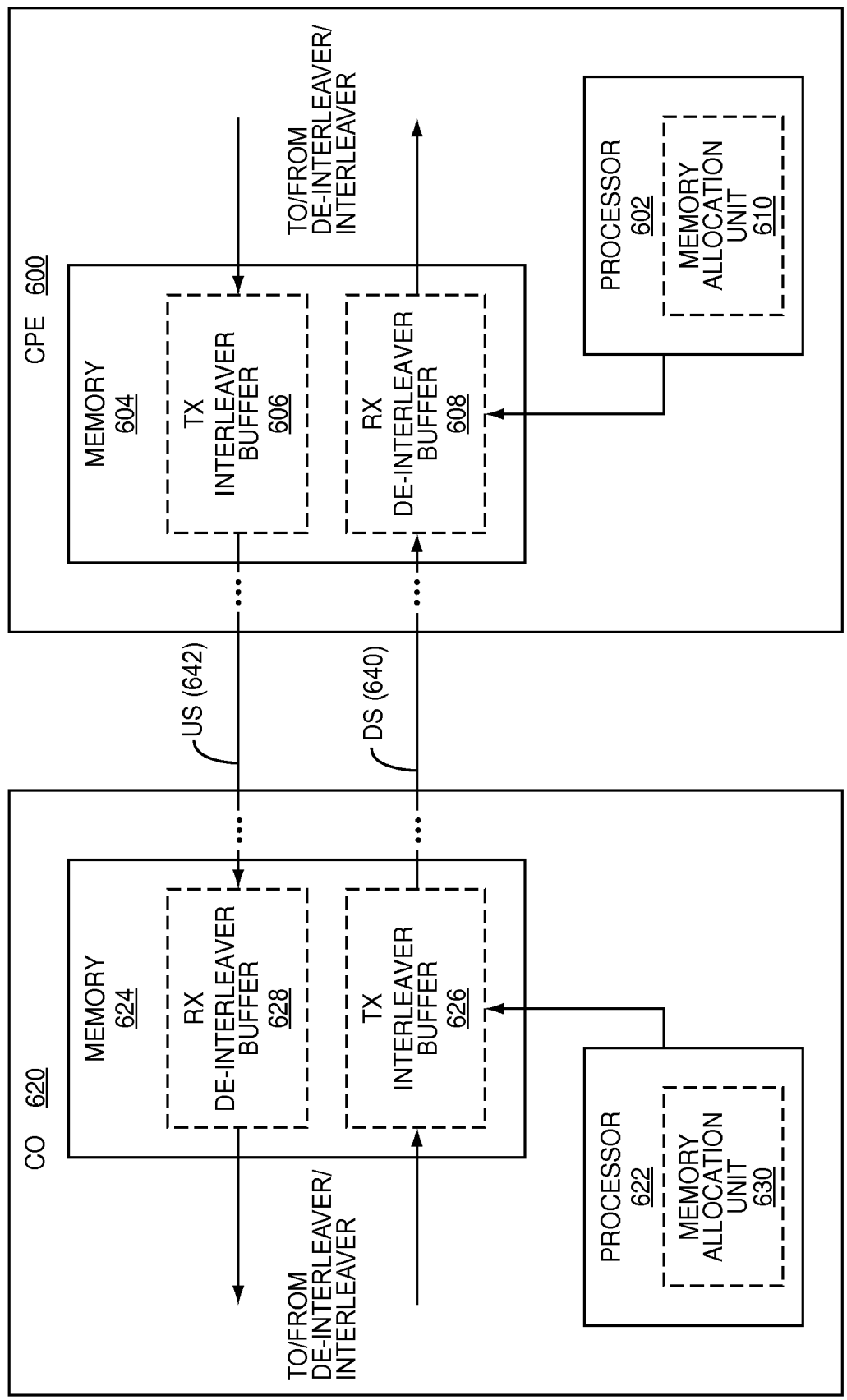
FIG. 6 is a block diagram of an embodiment of a first communication device having memory allocated between pre- and post-processing buffers coupled to a second communication device also having memory allocated between pre- and post-processing buffers.

FIG. 6 illustrates an embodiment of customer-premise equipment or customer-provided equipment (CPE) 600 such as a DSL or cable modem located at a subscriber's premises and connected with a carrier's telecommunication channel(s) at a point of demarcation point, e.g., a point established in a building or complex that separates the customer equipment from the carrier's network. The carrier, or a service provider which operates over the carrier's telecommunication channel(s), also has equipment (CO) 620 such as a DSL or cable modem for communicating with the CPE 600. The CPE 600 and the CO 620 include the same or similar components (e.g., digital interface, framer/de-framer, encoder/decoder, interleaver/de-interleaver, front end, etc.) as shown in the communication device 100 of FIG. 1. Notably, both the CPE 600 and the CO 620 include a processor 602/622 for managing overall operation of the respective communication devices.

Both the CPE 600 and CO 620 also have memory 604/624 which can be logically segmented into pre-processing and post-processing buffers, e.g., into a transmit interleaver buffer 606/626 and a receive de-interleaver buffer 608/628. Encoded data ready for transmission at either device 600/620 can be interleaved as it is stored in the corresponding transmit interleaver buffer 606/626, or subjected to other pre-processing buffering prior to transmission. Received data can be similarly de-interleaved as it is removed from the receive de-interleaver buffer 608/628, or subjected to other post-processing buffering after receipt. Both memories 604/624 are allocated between the interleaver and de-interleaver buffers 606/626, 608/627 based on upstream and downstream channel conditions as observed at the CPE 600 and the CO 620 as described in more detail later herein. This way, the CO 620 has a better understanding of both the upstream and downstream channels when performing memory allocation even when actual channel conditions such as impulse noise levels, user interference, cross-talk, electrical and radio interference, etc. are better or worse than expected. Each memory 604/624 can be allocated when a new communication channel is initialized between the CO 620 and CPE 600. Each memory 604/624 can also be reallocated for a preexisting channel, e.g., when upstream and/or downstream channel conditions change or when either the CPE 600 or CO 620 returns from a low power or sleep mode.

Data is transmitted from the CO 620 to the CPE 600 over a downstream channel (DS) 640. Data is transmitted from the CPE 600 to the CO 620 over an upstream channel (US) 642. The CPE and CO memories 604/624 are initially allocated based on a predetermined configuration, e.g., as previously described herein in accordance with Step 202 of FIG. 2, Step 300 of FIG. 3 or Step 502 of FIG. 5. During the channel initialization and training phase, the CO processor 622 establishes a communication link with the CPE 600 over the downstream and upstream channels 640/642. The CPE 600 estimates interleaver and de-interleaver and/or other pre- and post-processing memory requirements for the downstream direction during the initialization and training period based on downstream channel conditions estimated at the CPE 600. The CPE 600 communicates the downstream memory requirements to the CO 620 over the upstream channel 642.

The CO 620 similarly estimates interleaver and de-interleaver and/or other pre- and post-processing memory requirements for the upstream direction during the initialization and training period based on upstream channel conditions estimated at the CO 620. The CO 620 analyzes both the upstream and downstream memory requirements, and determines final upstream and downstream interleaver and de-interleaver and/or other pre- and post-processing memory allocations based on the memory requirements. The final memory allocations are communicated from the CO 620 to the CPE 600 over the downstream channel 640 during the training and initialization period if the memory allocation at the CPE 600 changes based on the analysis performed at the CO 620. Otherwise, the CPE 600 is instructed to use the initial predetermined memory allocation for subsequent normal data communication.

In more detail, the CO 620 includes a memory allocation unit 630 of the kind previously described herein. The CO memory allocation unit 630 estimates channel conditions for the upstream channel 642, e.g., based on impulse noise levels, user interference, cross-talk, electrical, radio interference, etc. observed at the CO 620 for the upstream channel 642. The CO memory allocation unit 630 determines an upstream memory requirement for the CO de-interleaver buffer 628 and the CPE interleaver buffer 606 based on the upstream channel conditions. The CO memory allocation unit 630 also processes the downstream memory requirement received from the CPE 600 for the CPE de-interleaver buffer 608 and the CO interleaver buffer 626. The downstream memory requirement received from the CPE 600 is based on downstream channel conditions estimated at the CPE 600 for the downstream channel 640.

The CO memory allocation unit 630 then determines whether the sum of the upstream and downstream memory requirements exceeds the available amount of memory for implementing the CO interleaver and de-interleaver buffers 626, 628. The CO memory allocation unit 630 revises at least one of the memory requirements if the sum of the upstream and downstream memory requirements is different than the total available amount of memory 624. The CO memory allocation unit 630 can revise either or both of the upstream and downstream memory requirements based on the upstream memory requirement determined at the CO 620 based on the upstream channel conditions, the downstream memory requirement received from the CPE 600, the available amount of CO/CPE memory 624/604 and one or more configuration parameters available at the CO 620 such as upstream and downstream data rates, maximum delay, QoS (quality of service) provisions, impulse noise protection configuration parameters, etc. as previously described herein. However, instead of estimating the downstream interleaver memory requirement based on upstream channel conditions, the CPE 600 provides a downstream interleaver memory requirement to the CO 620 which is based on actual observed downstream channel conditions. As such, the CO memory allocation unit 630 can determine a more efficient memory allocation based on a better understanding of the downstream channel 640.

According to one embodiment, the CO memory allocation unit 630 determines which one of the memory requirements to revise based on a priority bit. The priority bit indicates the priority of the upstream and downstream memory requirements. If the priority bit indicates the upstream channel 642 has priority, the CO memory allocation unit 630 allocates enough of the CO memory 624 to the receive de-interleaver buffer 628 of the CO 620 to satisfy the upstream buffer requirement. The remainder of the CO memory 624 is allocated to the transmit interleaver buffer 626 of the CO 620. The opposite memory allocation is performed when the priority bit indicates the downstream channel 640 has priority. In either case, the sum of the upstream and downstream memory requirements is preferably set equal to the total amount of CO memory 624 available for interleaving and de-interleaving. The CPE memory 604 can be allocated in the same way based on the priority bit.

The second embodiment for performing memory allocation when a conflict occurs also involves determining which one of the channels 640, 642 has a higher priority, e.g., again using the priority bit. According to the second embodiment, the CO memory 624 can be allocated three different ways depending on the priority and the magnitude of a correction factor (CF). When the downstream channel 640 has priority and the CF>1, the amount of CO memory 624 allocated to the receive de-interleaver buffer 628 of the CO 620 is given by equation (6). The transmit interleaver buffer 626 of the CO 620 is then allocated the remainder of the CO memory 624. When the upstream channel 642 has priority and the CF<1, the amount of CO memory 624 allocated to the transmit interleaver buffer 626 of the CO 620 is given by equation (7). The receive interleaver buffer 628 of the CO 620 is allocated the remainder of the CO memory 624. The third memory allocation option arises when neither of the first two conditions identified above are satisfied. Here, the total available CO memory 624 is split equally between the interleaver and de-interleaver buffers 626, 628 of the CO 620. In each case, the sum of the upstream and downstream memory requirements is preferably set equal to the available amount of CO memory 624. The CPE memory 604 can be allocated in the same way based on the priority bit and the correction factor.

At the CPE 600, the CPE processor 602 assists in establishing the communication link with the CO 620 over the downstream and upstream channels 640, 642 during the initialization and training period. The CPE 600 also includes a memory allocation unit 610 of the kind previously described herein. The CPE memory allocation unit 610 processes an upstream memory requirement received from the CO 620 for the CPE de-interleaver buffer 628 and the CO interleaver buffer 606. The upstream memory requirement is based on the channel conditions estimated at the CO 620 for the upstream channel 642 as previously described herein. Accordingly, it is the CO 620 that sets the upstream memory allocations at the CPE 600 based on upstream channel conditions estimated at the CO 620.

The CPE memory allocation unit 610 estimates downstream channel conditions for the downstream channel 640, e.g., based on impulse noise levels, user interference, crosstalk, electrical, radio interference, etc. observed at the CPE 600. The CPE 600 can estimate the downstream channel conditions much the same way that the CO 620 estimates upstream channel conditions. The CPE memory allocation unit 610 then determines the downstream memory requirement for the CPE de-interleaver buffer 608 and the CO interleaver buffer 626 based on the downstream channel conditions.

In one embodiment, the CPE memory allocation unit 610 estimates the capacity of the downstream channel 640 based on the downstream channel conditions and determines a downstream interleaver/de-interleaver buffer size that satisfies the downstream capacity estimate and one or more predetermined downstream configuration parameters such as maximum expected data rate and minimum delay. Each parameter has certain criteria, e.g., a minimum and/or maximum value. The CPE memory allocation unit 610 can determine the downstream memory requirement so that the configuration parameter criteria are satisfied. The CPE processor 602 then communicates the downstream memory requirement to the CO 620 which performs the processing described above to determine whether any memory allocation revisions are needed. In one embodiment, the CPE processor 602 communicates the downstream memory requirement to the CO 620 over the upstream channel 642 after the upstream memory requirement is received from the CO 620 during the channel initialization and training period.

The CPE memory allocation unit 610 allocates the CPE memory 604 between the interleaver and de-interleaver buffers 606, 608 of the CPE 600 in accordance with the upstream memory requirement received from the CO 620 and the downstream memory requirement determined at the CPE 600. Depending on the total available memory, the CO 620 may determine revisions to the memory allocations are required, e.g., when there is insufficient memory to satisfy both the upstream and downstream memory requirements. When such a condition occurs, the CO 620 revises the upstream and/or downstream memory allocations as described above and communicates the memory allocation revision(s) to the CPE 600. For example, the CO 620 may determine that only the interleaver or the de-interleaver memory allocation requires a revision. Alternatively, the CO 620 may determine that both the interleaver and the de-interleaver memory allocations must be revised. In either case, the CPE memory allocation unit 610 allocates the CPE memory 604 between the interleaver and de-interleaver buffers 606, 608 of the CPE 600 in accordance with the memory allocation revision(s) received from the CO 620. As such, both the CPE and CO memories 604/624 are allocated based on the upstream channel conditions observed at the CO 620 and the downstream channel conditions observed at the CPE 600.

Figure 7:
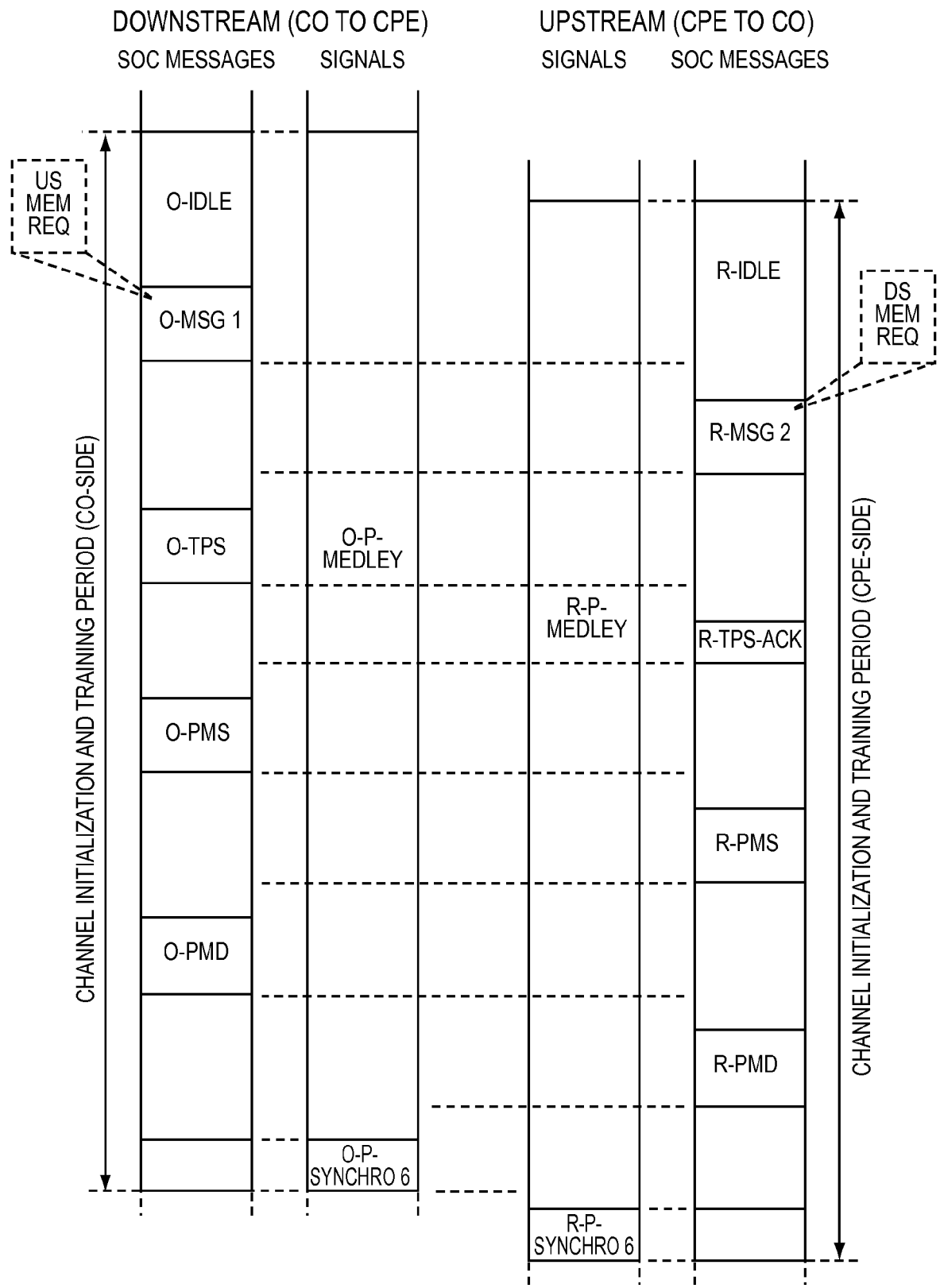
FIG. 7 is a message flow diagram of an embodiment for allocating memory between the pre- and post-processing buffers of the communication devices of FIG. 6.

FIG. 7 illustrates an embodiment of a messaging protocol implemented between the CO 620 and the CPE 600 during the channel initialization and training process. According to this embodiment, the CO 620 and CPE 600 are both VDSL2 compliant modems. During the channel initialization and training process, a special operations channel (SOC) is established between the CO 620 and CPE 600 to enable the bidirectional communication of messages between the two modems for supporting initialization, fast startup, and loop diagnostic procedures. The CO 620 sends an idle message (O-IDLE) when the SOC at the CO 620 is in the active state, but idle (i.e., there is no message to send). The CPE 600 similarly sends an idle message (R-IDLE) when its SOC is in the active state, but idle.

The CO 620 then sends an O-MSG1 message to the CPE 600 which includes the capabilities of the CO 620 and a number of downstream configuration parameters. The O-MSG1 message also includes the upstream interleaver/de-interleaver memory requirement determined at the CO 620 based on the upstream channel conditions as described previously described herein. In one embodiment, two new fields are added to the conventional O-MSG1 message. The first new field indicates the upstream interleaver/de-interleaver memory requirement determined by the CO 620 for latency path #0 in the upstream direction. The second new field similarly indicates the upstream interleaver/de-interleaver memory requirement determined by the CO 620 for latency path #1 in the upstream direction. If a single latency path is supported (i.e., latency path #0), the CO 620 sets the values for latency path #1 to zero in the second field. Each new field may have a size of one or more bytes for indicating the upstream memory requirement.

The CPE 600 replies to the O-MSG1 message received from the CO 620 by sending an R-MSG2 message which includes the capabilities of the CPE 600. The R-MSG2 message also includes the downstream interleaver/de-interleaver memory requirement determined at the CPE 600 based on the downstream channel conditions as described previously described herein. In one embodiment, two new fields are also added to the conventional R-MSG2 message. The first new field indicates the downstream interleaver/de-interleaver memory requirement determined by the CPE 600 for latency path #0 in the downstream direction. The second new field similarly indicates the downstream interleaver/de-interleaver memory requirement determined by the CPE 600 for latency path #1 in the downstream direction. If a single latency path is supported, the CPE 600 sets the values for latency path #1 to zero in the second field of the R-MSG2 message. Each new field included in the R-MSG2 message may have a size of one or more bytes for indicating the downstream memory requirement. The CPE 600 then sends the R-MSG2 message to the CO 620 for processing.

If the sum of the upstream memory requirement determined at the CO 620 and the downstream memory requirement received from the CPE 600 is less than or equal to the maximum amount of memory available at the CO and CPE for a particular profile, the CO 620 and CPE 600 continue exchanging information as conventionally done. For example, the CO 620 sends an O-TPS message to the CPE 600 for indicating the configuration of the bearer channels and the required capabilities for both the upstream and the downstream directions. The CPE 600 acknowledges the O-TPS message with an R-TPS-ACK message. The CO 620 then conveys the upstream framing parameters to the CPE 600 by sending an O-PMS message. The CPE 600 similarly conveys the downstream framing parameters to the CO 620 by sending an R-PMS message. The CO 620 then sends an O-PMD message to the CPE 600 which includes the bits, gains and tone ordering tables for the upstream PMD (physical media dependent) function. The CPE 600 responds by sending an R-PMD message to the CO 620 which includes the bits, gains and tone ordering tables for the downstream PMD function. After sending the R-PMD, the CO 620 and CPE 600 are ready to transition to showtime (i.e., normal data communication).

When the sum of the upstream and downstream memory requirements is less than or equal to the maximum amount of memory available at the CO and CPE, the additional available memory is allocated to the direction having the higher priority as described previously herein. However, if the total memory requirement is greater than the total available amount of memory, the CO 620 revises one or both of the memory requirements. In one embodiment, the CO 620 takes into account the downstream memory requirement determined by the CPE 600 and which is communicated in the R-MSG2 message. The CO 620 may also take into account one or more additional configuration parameters, e.g., from the CO MIB and determines a revised upstream memory requirement, a revised downstream memory requirement, or both. The CO 620 communicates the memory allocation revisions(s) to the CPE 600 in the downstream direction using the O-PMS message. This way, the CO 620 does not make arbitrary memory allocation decisions without having any information on the downstream environment and corresponding interleaver/de-interleaver settings.

The downstream information received from the CPE 600 provides a contention resolution control mechanism for the CO 620 when the aggregate memory requested as part of the O-MSG1/R-MSG2 message exchange is more than the total memory specified for a particular profile. Consider the following purely illustrative example, where the CO 620 and CPE 600 are configured for VDSL2 profile 12a. The total available memory for upstream and downstream interleaver and de-interleaver operations is 64 KB and the downstream channel 640 has the higher priority. Based on impulse noise and delay requirements, the CO 620 may determine that the upstream channel 642 requires 48 KB of interleaver/de-interleaver memory and the CPE 600 may determine that the downstream channel 640 also requires 48 KB of interleaver-de-interleaver memory. The total required memory is then 96 KB, which is greater than the total amount of available memory (64 KB in this example) for the 12a VDSL2 profile. In response, the CO 620 can allocate 48 KB for the downstream and the remainder of the available memory (16 KB) for the upstream since the downstream has greater priority. Such a memory allocation may result in a lower data rate for the upstream channel 642, however this compromise is optimized in view of the upstream and downstream channel conditions and priorities.

The CO 620 could also use a correction factor for determining the final memory allocation. The correction factor may be used in addition to, or in place of the priority information. The correction factor determines the percentage of the excess or deficit memory that should be shared between the downstream and upstream directions. In some embodiments, the parameter ranges from 1% to 100%. In other embodiments, the correction factor can be an integer or non-integer value instead of a percentage. In another purely illustrative example, a correction factor of 50% indicates that if any excess memory is available, it should be shared equally between the upstream and downstream directions. If the available memory is less than the required memory, then the reduction in memory is equally shared amongst the upstream and downstream directions. In yet another purely illustrative example, a correction factor of 75% indicates if any excess memory is available, 75% of it should be allocated to the direction having the higher priority and the remaining 25% should be allocated to the other direction. If there is insufficient memory available, the reduction is achieved by reducing 75% of the excess requirement from the direction having the lower priority and the remaining from the direction having the higher priority. In a case where 64 KB of total memory is available for interleaver and de-interleaver buffering (i.e., VDSL2 profile 12a) and the downstream requires 48 KB as determined by the CPE 600 and the upstream requires 48 KB as determined by the CO 620, the required reduction in memory is 32 KB, leaving 32 KB requiring adjustment. If the downstream has priority, then 25% of the 32 KB reduction (i.e., 8 KB) is removed from downstream interleaver/de-interleaver allocation and 24 KB is removed from the upstream interleaver/de-interleaver allocation. Of course, those skilled in the art will readily recognize that various other memory allocation correction factors may be employed in view of the teachings disclosed herein.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of allocating memory at a first communication device coupled to a second communication device over upstream and downstream channels, comprising:
    estimating upstream channel conditions at the first communication device for the upstream channel;
    determining an upstream memory requirement at the first communication device for an interleaver buffer at the second communication device and a de-interleaver buffer at the first communication device based on the upstream channel conditions;
    receiving a downstream memory requirement from the second communication device for an interleaver buffer at the first communication device and a de-interleaver buffer at the second communication device based on downstream channel conditions estimated at the second communication device for the downstream channel;
    determining at the first communication device whether the sum of the upstream and downstream memory requirements exceeds an available amount of memory for implementing the interleaver and de-interleaver buffers at the first communication device; and
    revising at least one of the memory requirements at the first communication device if the sum of the upstream and downstream memory requirements is different than the available amount of memory.

2. The method of claim 1, comprising communicating the upstream memory requirement determined based on the upstream channel conditions to the second communication device over the downstream channel during a channel initialization and training period.

3. The method of claim 1, comprising instructing the second communication device to adhere to any memory requirement revisions made at the first communication device during a channel initialization and training period.

4. The method of claim 1, comprising determining which one of the memory requirements to revise at the first communication device based on a priority bit which indicates priority of the upstream and downstream memory requirements.

5. The method of claim 1, comprising decreasing the memory requirement having a lowest priority at the first communication device so that after the decreasing step, the sum of the upstream and downstream memory requirements is equal to the available amount of memory.

6. The method of claim 1, comprising increasing the memory requirement having a highest priority at the first communication device so that after the increasing step, the sum of the upstream and downstream memory requirements is equal to the available amount of memory.

7. The method of claim 1, comprising revising the upstream and downstream memory requirements at the first communication device based on a correction factor so that after the revising step, the sum of the upstream and downstream memory requirements is equal to the available amount of memory.

8. The method of claim 1, comprising revising at least one of the memory requirements at the first communication device based on the upstream memory requirement determined based on the upstream channel conditions, the downstream memory requirement received from the second communication device, the available amount of memory and one or more interleaver/de-interleaver settings known at the first communication device.

9. A communication device, comprising:
    a processor configured to establish a communication link with another communication device over upstream and downstream channels;
    memory configured to be allocated between an interleaver buffer and a de-interleaver buffer of the communication device; and
    a memory allocation unit configured to:
        estimate upstream channel conditions for the upstream channel;
        determine an upstream memory requirement for an interleaver buffer at the other communication device and the de-interleaver buffer of the communication device based on the upstream channel conditions;
        process a downstream memory requirement received from the other communication device for the interleaver buffer of the communication device and a de-interleaver buffer at the other communication device based on downstream channel conditions estimated at the other communication device for the downstream channel;
        determine whether the sum of the upstream and downstream memory requirements exceeds an available amount of memory for implementing the interleaver and de-interleaver buffers of the communication device; and
        revise at least one of the memory requirements if the sum of the upstream and downstream memory requirements is different than the available amount of memory.

10. The communication device of claim 9, wherein the processor is configured to communicate the upstream memory requirement determined based on the upstream channel conditions to the other communication device over the downstream channel during a channel initialization and training period.

11. The communication device of claim 9, wherein the processor is configured to instruct the other communication device to adhere to any memory requirement revisions made at the communication device during a channel initialization and training period.

12. The communication device of claim 9, wherein the memory allocation unit is configured to determine which one of the memory requirements to revise based on a priority bit which indicates priority of the upstream and downstream memory requirements.

13. The communication device of claim 9, wherein the memory allocation unit is configured to decrease the memory requirement having a lowest priority so that after the memory requirement is decreased, the sum of the upstream and downstream memory requirements is equal to the available amount of memory.

14. The communication device of claim 9, wherein the memory allocation unit is configured to increase the memory requirement having a highest priority so that after the memory requirement is increased, the sum of the upstream and downstream memory requirements is equal to the available amount of memory.

15. The communication device of claim 9, wherein the memory allocation unit is configured to revise the upstream and downstream memory requirements based on a correction factor so that after the upstream and downstream memory requirements are revised, the sum of the upstream and downstream memory requirements is equal to the available amount of memory.

16. The communication device of claim 9, wherein the memory allocation unit is configured to revise at least one of the memory requirements based on the upstream memory requirement determined based on the upstream channel conditions, the downstream memory requirement received from the second communication device, the available amount of memory and one or more interleaver/de-interleaver settings known at the communication device.

17. A method of allocating memory at a first communication device coupled to a second communication device over upstream and downstream channels, comprising:
    receiving an upstream memory requirement from the second communication device for a de-interleaver buffer at the first communication device and an interleaver buffer at the second communication device based on upstream channel conditions estimated at the second communication device for the upstream channel;
    estimating downstream channel conditions at the first communication device for the downstream channel;
    determining a downstream memory requirement at the first communication device for a de-interleaver buffer at the second communication device and an interleaver buffer at the first communication device based on the downstream channel conditions; and
    communicating the downstream memory requirement to second communication device.

18. The method of claim 17, comprising communicating the downstream memory requirement to the second communication device over the upstream channel after receiving the upstream memory requirement from the second communication device during a channel initialization and training period.

19. The method of claim 17, further comprising allocating memory at the first communication device between the interleaver and de-interleaver buffers of the first communication device in accordance with the upstream memory requirement received from the second communication device and the downstream memory requirement determined by the first communication device.

20. The method of claim 17, further comprising:
    receiving one or more memory allocation revisions from the second communication device; and
    allocating memory at the first communication device between the interleaver and de-interleaver buffers of the first communication device in accordance with the one or more memory allocation revisions received from the second communication device.

21. A communication device, comprising:
    a processor configured to establish a communication link with another communication device over upstream and downstream channels;
    memory configured to be allocated between an interleaver buffer and a de-interleaver buffer of the communication device; and
    a memory allocation unit configured to:
        process an upstream memory requirement received from the other communication device for the de-interleaver buffer of the communication device and an interleaver buffer at the other communication device based on upstream channel conditions estimated at the other communication device for the upstream channel;
        estimate downstream channel conditions for the downstream channel;
        determine a downstream memory requirement for a de-interleaver buffer at the other communication device and the interleaver buffer of the communication device based on the downstream channel conditions; and
    wherein the processor is further configured to communicate the downstream memory requirement to other communication device.

22. The communication device of claim 21, wherein the processor is configured to communicate the downstream memory requirement to the other communication device over the upstream channel after the upstream memory requirement is received from the other communication device during a channel initialization and training period.

23. The communication device of claim 21, wherein the memory allocation unit is configured to allocate the memory between the interleaver and de-interleaver buffers of the communication device in accordance with the upstream memory requirement received from the other communication device and the downstream memory requirement.

24. The communication device of claim 21, wherein the memory allocation unit is configured to allocate the memory between the interleaver and de-interleaver buffers of the communication device in accordance with one or more memory allocation revisions received from the second communication device.

25. A communication device, comprising:
    a processor configured to establish a communication link with another communication device over upstream and downstream channels;
    memory configured to be allocated between first and second buffers; and
    a memory allocation unit configured to:
        estimate upstream channel conditions for the upstream channel;
        determine an upstream memory requirement for the first buffer based on the upstream channel conditions;
        process a downstream memory requirement received from the other communication device for the second buffer based on downstream channel conditions estimated at the other communication device for the downstream channel;
        determine whether the sum of the upstream and downstream memory requirements exceeds an available amount of memory for implementing the first and second buffers; and
        revise at least one of the memory requirements if the sum of the upstream and downstream memory requirements is different than the available amount of memory.

26. The communication device of claim 25, wherein the first buffer is operable to store data received at the communication device over the upstream channel.

27. The communication device of claim 25, wherein the second buffer is operable to store data for transmission from the communication device over the downstream channel.

* * * * *